(12) United States Patent
Garner et al.

(10) Patent No.: US 8,202,449 B2
(45) Date of Patent: Jun. 19, 2012

(54) CORROSION-INHIBITED AMMONIUM POLYPHOSPHATE FIRE RETARDANT COMPOSITIONS

(75) Inventors: Andrew Garner, Vancouver (CA); Neville James Stead, Delta (CA)

(73) Assignee: ICL Performance Products, LP, St. Louis, MO (US)

( * ) Notice: Subject to any disclaimer, the term of this patent is extended or adjusted under 35 U.S.C. 154(b) by 1278 days.

(21) Appl. No.: 11/589,749

(22) Filed: Oct. 31, 2006

(65) Prior Publication Data
US 2008/0099735 A1 May 1, 2008

(51) Int. Cl.
*C09K 21/00* (2006.01)
(52) U.S. Cl. ............... 252/601; 252/387; 252/389.2; 252/389.53; 252/389.62; 252/390; 423/463; 423/464; 423/465
(58) Field of Classification Search ............ 252/601, 252/387, 389.2, 389.52, 389.53, 389.62, 252/390; 423/463, 464, 465
See application file for complete search history.

(56) References Cited

U.S. PATENT DOCUMENTS

| | | | | |
|---|---|---|---|---|
| 2,848,299 A * | 8/1958 | Kahler et al. | .................. | 422/18 |
| 3,088,819 A | 5/1963 | Funkhouser | | |
| 3,192,013 A | 6/1965 | Young | | |
| 3,245,904 A * | 4/1966 | Young | ............... | 252/7 |
| 3,257,316 A * | 6/1966 | Langguth et al. | .................. | 252/7 |
| 3,309,324 A * | 3/1967 | Langguth et al. | ............ | 252/387 |
| 3,388,966 A | 6/1968 | MacDonald | | |
| 3,542,686 A * | 11/1970 | Miller | ............... | 252/70 |
| 3,730,890 A * | 5/1973 | Nelson et al. | ............... | 252/7 |
| 3,809,653 A | 5/1974 | Sansing et al. | | |
| 3,861,897 A | 1/1975 | Frazier | | |
| 3,960,735 A * | 6/1976 | Lacey | ............... | 252/2 |
| 4,011,301 A | 3/1977 | Young | | |
| 4,053,561 A | 10/1977 | Irani | | |
| 4,136,199 A | 1/1979 | Mills | | |
| 4,500,502 A | 2/1985 | McDonald et al. | | |
| 4,505,566 A * | 3/1985 | Noguchi | ............ | 396/75 |
| 4,522,651 A * | 6/1985 | Seeney et al. | ............ | 106/38.3 |
| 4,639,359 A | 1/1987 | Michalski et al. | | |
| 4,692,323 A | 9/1987 | Bonel et al. | | |
| 4,983,326 A * | 1/1991 | Vandersall | ............ | 252/603 |
| 6,395,200 B2 * | 5/2002 | Crouch et al. | ............ | 252/603 |
| 6,620,348 B1 | 9/2003 | Vandersall et al. | | |
| 6,802,994 B1 | 10/2004 | Kegler et al. | | |
| 6,846,437 B2 * | 1/2005 | Vandersall et al. | ............ | 252/603 |
| 6,905,639 B2 | 6/2005 | Vandersall et al. | | |
| 2007/0029531 A1 * | 2/2007 | Ronan et al. | ............ | 252/601 |

OTHER PUBLICATIONS

Chemical Abstracts (American Chemical Society) Nov. 28, 1977; vol. 87; Abstract No. 169219k.
International Search Report for corresponding PCT/CA2007/001938.

* cited by examiner

Primary Examiner — Mark Eashoo
Assistant Examiner — Jane L Stanley
(74) Attorney, Agent, or Firm — Thompson Coburn LLP

(57) ABSTRACT

A fire-retardant composition comprising an ammonium polyphosphate, a suspending agent and an effective amount of a corrosion inhibiting agent. When in solution the corrosion inhibiting agent includes at least one ion selected from the group of ions consisting of aluminum ions, ferric ions, calcium ions and magnesium ions. Said ions complex an effective amount of fluoride ions present in the fire-retardant composition to reduce the corrosiveness of the fire-retardant composition.

16 Claims, 5 Drawing Sheets

Corrosion characteristics of fire-retardant compositions to which fluoride[1-] ions have been added in the form of sodium fluoride.

| Test | Fluoride[1-] ions added | Corrosion Rate |
|---|---|---|
| | ppm | mpy |
| A | 0 | 29 |
| B | 100 | 39 |
| C | 600 | 44 |
| D | 1600 | 57 |
| E | 2600 | 82 |

FIGURE 1

Corrosion characteristics of fire retardant compositions according to the invention based on electrochemical tests (linear polarization resistance) and 1 day immersion tests (corrosion rate).

| Sample | Linear Polarization Resistance Data | | | Corrosion Rate | Notes and Observations |
| --- | --- | --- | --- | --- | --- |
| | ohms | Icorr mA/cm² | mpy | mpy | |
| Control 1 | 9 | 0.242 | 118 | 180 | |
| Control 2 | 59 | 0.039 | 19 | 29 | Semi-adherent scale |
| Control 3 | 42 | 0.052 | 26 | 54 | Semi-adherent scale |
| Control 4 | 5669 | 0.0004 | 0.2 | -30 | Adherent blue scale |
| Control 5 | 390 | 0.006 | 3 | -86 | Semi-adherent blue scale |
| Sample 1 | 61 | 0.034 | 17 | 54 | Semi-adherent scale |
| Sample 2 | 62 | 0.035 | 18 | 34 | Semi-adherent scale |
| Sample 3 | 94 | 0.023 | 11 | 50 | Semi-adherent scale |
| Sample 4 | 100 | 0.023 | 12 | 68 | Semi-adherent film |
| Sample 5 | 155 | 0.014 | 7 | 27 | Adherent stain |
| Sample 6 | 204 | 0.01 | 5.1 | 28 | Adherent stain |
| Sample 7 | 279 | 0.008 | 4 | 23 | Adherent film |
| Sample 8 | 304 | 0.007 | 3 | 22 | Adherent stain |
| Sample 9 | 313 | 0.007 | 3.6 | 3 | Adherent stain |
| Sample 10 | 344 | 0.006 | 3 | 20 | Adherent stain |

FIGURE 2

| Sample | Linear Polarization Resistance Data | | | Corrosion Rate | Notes and Observations |
|---|---|---|---|---|---|
| | ohms | Icorr mA/cm$^2$ | mpy | mpy | |
| Sample 11 | 354 | 0.006 | 3 | 34 | Semi-adherent stain |
| Sample 12 | 359 | 0.006 | 3 | 26 | Adherent stain |
| Sample 13 | 366 | 0.006 | 3 | 35 | Adherent stain |
| Sample 14 | 371 | 0.006 | 3 | 17 | Adherent stain |
| Sample 15 | 408 | 0.005 | 3 | 19 | Adherent stain |
| Sample 16 | 434 | 0.005 | 2.5 | 38 | Semi-adherent stain |
| Sample 17 | 442 | 0.005 | 2 | 21 | Adherent film |
| Sample 18 | 477 | 0.005 | 2 | 16 | Adherent stain |
| Sample 19 | 478 | 0.005 | 2 | 19 | Adherent stain |
| Sample 20 | 490 | 0.005 | 2.4 | 15 | Adherent stain |
| Sample 21 | 550 | 0.004 | 2 | 36 | Adherent stain |
| Sample 22 | 606 | 0.004 | 1.8 | 17 | Adherent stain |
| Sample 23 | 632 | 0.004 | 2 | 11 | Adherent stain |
| Sample 24 | 638 | 0.003 | 1.7 | 10 | Semi-adherent stain |
| Sample 25 | 644 | 0.0035 | 1.8 | 8 | Small patch of scale |
| Sample 26 | 691 | 0.003 | 2 | 5 | Adherent stain |

FIGURE 2 CONT.

| Sample | Linear Polarization Resistance Data | | | Corrosion Rate | Notes and Observations |
|---|---|---|---|---|---|
| | ohms | Icorr mA/cm$^2$ | mpy | mpy | |
| Sample 27 | 706 | 0.003 | 1.5 | 41 | Semi-adherent stain |
| Sample 28 | 782 | 0.003 | 1 | 25 | Adherent stain |
| Sample 29 | 960 | 0.0023 | 1.2 | 14 | Adherent stain |
| Sample 30 | 1106 | 0.002 | 1 | 14 | Adherent stain |
| Sample 31 | 1242 | 0.0018 | 0.9 | -20 | Adherent stain |
| Sample 32 | 1414 | 0.0015 | 0.8 | 8 | Adherent stain |
| Sample 33 | 1683 | 0.001 | 0.6 | 19 | Semi-adherent stain |
| Sample 34 | 1762 | 0.0012 | 0.6 | 29 | Semi-adherent stain |
| Sample 35 | 1765 | 0.001 | 0.7 | 16 | Adherent stain |
| Sample 36 | 2675 | 0.001 | 0.4 | 8 | Adherent stain |
| Sample 37 | n/a | n/a | n/a | 16 | Adherent speckled stain |
| Sample 38 | 4195 | 0.0005 | 0.25 | 4 | Adherent stain |

FIGURE 2 CONT.

Corrosion characteristics of fire retardant compositions according to the invention based on 30 day immersion tests.

| Sample | Corrosion Rate |
|---|---|
|  | mpy |
| Control 1 | 132.48 |
| Control 2 | 0.87 |
| Sample 1 | 2.25 |
| Sample 2 | 1.85 |
| Sample 3 | 1.77 |
| Sample 4 | 1.28 |
| Sample 5 | 1.01 |
| Sample 6 | 0.98 |
| Sample 7 | 0.95 |
| Sample 8 | 0.87 |
| Sample 9 | 0.57 |

FIGURE 3

CORROSION-INHIBITED AMMONIUM POLYPHOSPHATE FIRE RETARDANT COMPOSITIONS

BACKGROUND OF THE INVENTION

The present invention relates to a fire-retardant composition, and in particular, to a corrosion-inhibited ammonium polyphosphate fire-retardant composition.

Ammonium polyphosphate fire-retardant compositions are widely used to effectively combat the spread wildland fires. Typically, ammonium polyphosphate fire-retardants are supplied and stored in tanks as a concentrated suspension or slurry. In the event of a fire, the stored ammonium polyphosphate fire-retardant is diluted and transported using fixed-wing aircraft or helicopters for aerial application to the fire. However, ammonium polyphosphate can be extremely corrosive to aluminum, carbon steel, brass, and magnesium. It is therefore necessary to corrosion inhibit the ammonium polyphosphate fire-retardant to protect the equipment used to produce, store, handle and apply the ammonium polyphosphate fire-retardant.

It is known that iron additives may reduce the corrosiveness of ammonium polyphosphate fire-retardants to aluminum. This is disclosed in U.S. Pat. Nos. 6,620,348 and 6,846,437 to Vandersall et al., and U.S. Pat. No. 6,802,994 to Kegler et al., all of which are incorporated herein by reference. However, certain iron additives, in the form of dissolved salts, are oxidizers and can increase the corrosiveness of the ammonium polyphosphate fire-retardants to carbon steel. As such, carbon steel tanks used to store ammonium polyphosphate fire-retardants with iron additives require an epoxy coating to protect against corrosion. There is therefore a need for an improved corrosion-inhibited ammonium polyphosphate fire-retardant composition.

SUMMARY OF THE INVENTION

According to a first aspect of the invention, there is provided a fire-retardant composition comprising an ammonium polyphosphate, a suspending agent and an effective amount of a corrosion inhibiting agent. When in solution the corrosion inhibiting agent includes at least one ion selected from the group of ions consisting of aluminum ions, ferric ions, calcium ions and magnesium ions. Said ions complex an effective amount of fluoride ions present in the fire-retardant composition to reduce the corrosiveness of the fire-retardant composition.

More specifically, according to a preferred embodiment of the fire-retardant composition of the invention, there is provided a fire-retardant composition comprising an ammonium polyphosphate, a suspending agent, and a corrosion inhibiting agent. When in solution the corrosion inhibiting agent includes an effective amount of aluminum ions. The aluminum ions are added as aluminum sulphate and complex an effective amount of fluoride ions present in the fire-retardant composition to reduce the corrosiveness of the fire-retardant composition. The fire-retardant composition may include a thickening agent. The fire-retardant composition may also including a coloring agent. The fire-retardant composition may further include an amine. The fire-retardant composition may still further include an azole.

According to a second another aspect of the invention, there is provided a method for reducing the corrosiveness of an ammonium polyphosphate solution. The method comprises the step of complexing an effective amount of fluoride ions present in the ammonium polyphosphate solution to reduce the corrosiveness of the ammonium polyphosphate solution.

More specifically, according to a preferred embodiment of the method of the invention, there is provided a method for reducing the corrosiveness of an ammonium polyphosphate solution comprising the step of adding an effective amount of at least one ion selected from the group of ions consisting of aluminum ions, ferric ions, calcium ions and magnesium ions to the ammonium polyphosphate solution. Said ions complex an effective amount of fluoride ions present in the ammonium polyphosphate solution to reduce the corrosiveness of the ammonium polyphosphate solution.

According to a third aspect of the invention, there is provided a method of producing a corrosion-inhibited ammonium polyphosphate fire-retardant composition. The method comprises the steps of producing a fire-retardant composition that includes an ammonium polyphosphate and a suspending agent, and adding an effective amount of a corrosion inhibiting agent to the fire-retardant composition. When in solution the corrosion inhibiting agent includes at least one ion selected from the group of ions consisting of aluminum ions, ferric ions, calcium ions and magnesium ions. Said ions complex an effective amount of fluoride ions present in the fire-retardant composition to reduce the corrosiveness of the fire-retardant composition.

According to a fourth aspect of the invention, there is provided a method of combating wildland fires comprising aerially applying the ammonium polyphosphate fire-retardant composition of the present invention to the wildland fire.

BRIEF DESCRIPTION OF THE FIGURES

In the figures:

FIG. 1 shows the corrosion characteristics of fire-retardant compositions to which fluoride$^{1-}$ ions have been added in the form of sodium fluoride.

FIG. 2 shows the corrosion characteristics of fire-retardant compositions according to the invention based on electrochemical tests and 1 day immersion tests; and FIG. 3 shows the corrosion characteristics of fire-retardant compositions according to the invention based on 30 day immersion tests.

DETAILED DESCRIPTION OF THE PREFERRED EMBODIMENT

According to the present invention, it is disclosed that the corrosiveness of ammonium polyphosphate based fire-retardant compositions may be reduced by reducing the level of fluoride$^{1-}$ ions in the ammonium polyphosphate solution. As shown in Table 1, ammonium based fire-retardant compositions with increased levels of fluoride$^{1-}$ ions exhibited increased corrosivity. In Table 1 the ammonium based fire-retardant composition comprises ammonium polyphosphate with clay and colouring agent.

Ammonium polyphosphate solutions that are used in the production of fire-retardant compositions are typically prepared by neutralizing aqueous solutions of wet-process phosphoric acid with anhydrous ammonia. The method of preparing wet-process phosphoric acid is well known in the art and includes the acidification of phosphate-rich rock using sulphuric acid. Phosphate-rich rock used in the preparation of wet-process phosphoric acid generally contains fluorine in the form of fluoroapatite or various metal fluorides. For example, phosphate-rich rock having traces of commingled magnesium-bearing rock may contain magnesium fluoride.

Phosphoric acid prepared by the wet-process method therefore tends to be contaminated with fluorine impurities generally in the form of hydrogen fluoride, fluosilicic acid or fluosilicates. Hydrogen fluoride is soluble and as a result fluoride$^{1-}$ ions are often present in wet-process phosphoric acid.

It is known to remove fluorine impurities from wet-process phosphoric acid as disclosed in U.S. Pat. No. 3,972,982 to Centofanti, U.S. Pat. No. 4,639,359 to Michalski et al. and U.S. Pat. No. 4,692,323 to Bonel et al., all if which are incorporated herein by reference. However, there is still a level of fluorides$^{1-}$ ion contamination in commercially available ammonium polyphosphate solutions which are used in the production of fire-retardant compositions. Reducing the level of fluoride$^{1-}$ ions in the ammonium polyphosphate solutions prior to or during the production of ammonium polyphosphate fire-retardant compositions results in fire-retardant compositions having reduced corrosiveness.

The fire-retardant compositions of the invention include at least one ammonium polyphosphate solution, at least one suspending agent, and at least one corrosion inhibiting agent. Ammonium polyphosphate is the active fire-retardant. The suspending agent reduces separation and settling of the fire-retardant composition during storage and may be selected from the group of known suspending agents which are used in ammonium polyphosphate fire-retardant compositions including but not limited to colloidal clays such as Attapulgus clay, Fuller's earth, Kaolin clay, Monotomorillonite clay, and Sepiolite clay. The corrosion inhibiting agent reduces the corrosiveness of the fire-retardant composition by reducing the level of fluoride$^{1-}$ ions in the fire-retardant composition. It will be understood by those skilled in the art that the fire-retardant composition is prepared by mixing the ammonium polyphosphate solution, the suspending agent and the corrosion inhibiting agent into a suspension or slurry. It will further be understood by those skilled in the art that fire-retardant composition may be diluted prior to use.

When in solution the corrosion inhibiting agent contains at least one ion selected from the group of ions consisting of aluminum$^{3+}$ ions, ferric$^{3+}$ ions, calcium$^{2+}$ ions and magnesium$^{2+}$ ions. Said ions complex an effective amount fluoride$^{1-}$ ions present in the ammonium polyphosphate to reduce the corrosiveness of the ammonium polyphosphate and, by extension, reduce the corrosiveness of the fire-retardant composition. The corrosion inhibiting agent may be added as either a solution or a solid. Furthermore, the corrosion inhibiting agent may be added directly to the ammonium polyphosphate solution prior to producing the fire-retardant composition or the corrosion inhibiting agent may added to a prepared ammonium phosphate fire-retardant composition.

The fire-retardant composition of the invention may also include a thickening agent. Thickening agents modify the theological characteristics of fire-retardant compositions allowing for improved aerial application. More specifically, fire-retardant compositions with thickening agents exhibit improved elasticity allowing for a more even distribution of the fire-retardant composition when it is dropped from the air. The thickening agent used in the invention may be selected from the group of known thickening agents which are used in ammonium polyphosphate fire-retardant compositions including but not limited to guar gum, xanthan gum and arabic gum.

The fire-retardant composition of the invention may also include a coloring agent. Coloring agents are used to increase the visibility of fire-retardant compositions and are especially useful in the visual identification of treated and untreated wildland from the air. The coloring agent used in the invention may be selected from the group of known coloring agents which are used in ammonium polyphosphate fire-retardant compositions including but not limited to iron oxides and fugitive coloring agents.

The fire-retardant composition of the invention may also include a surface active agent. Surface active agents or surfactants increase the visibility of fire-retardant compositions by catalysing the generation of a foam. Preferably the surfactant used in the invention is an amine but it will be understood by those skilled in the art that any known surfactant that is used with ammonium polyphosphate fire-retardant compositions may be used. Amines which may be used in the invention include but are not limited to ethanolamine, diethanolamine, diethylamine, triethanolamine, and triethylene tetramine. Amines are additionally useful in the invention because they have corrosion inhibiting characteristics.

The fire-retardant composition of the invention may also include an azole. Azoles are effective corrosion inhibitors for brass when used in ammonium polyphosphate fire-retardant compositions. Preferably the azole used in the invention is benzotriazole but it will be understood by those skilled in the art that any known azole that is used with ammonium polyphosphate fire-retardant compositions may be used.

The fire-retardant composition of the invention may also include sodium benzoate. Sodium benzoate is an effective corrosion inhibitor for steel and aluminum when used in ammonium polyphosphate fire-retardant compositions.

It will further be understood by a person skilled in the art that the fire-retardant composition of the invention may include any additional additive as is known in the art.

In the invention it is shown that when fluoride$^{1-}$ ions in ammonium polyphosphate fire-retardant compositions are complexed or precipitated the corrosiveness of the fire-retardant composition is substantially lower than both commercially available ammonium polyphosphate and commercially available ammonium polyphosphate mixed with clay and a coloring agent, as measured by electrochemical tests and immersion tests. In the invention fluoride$^{1-}$ ions are complexed with aluminum$^{3+}$ ions as an aluminum-containing fluoride salt, with ferric$^{3+}$ ions as an iron-containing fluoride salt, or with calcium$^{2+}$ as a calcium-containing fluoride salt, or with magnesium$^{2+}$ ions as a magnesium-containing fluoride salt. However, it will be understood by a person skilled in the art that because the invention lies in reducing the level of fluorides$^{-1}$ ions in the ammonium polyphosphate fire-retardant composition, any known and suitable ion or compound may be used to complex or precipitate the fluoride$^{1-}$ ions and reduce the corrosiveness of the ammonium polyphosphate fire-retardant composition, according to the invention. For example, a silicate may be used to complex or precipitate the fluoride$^{1-}$ ions.

As mentioned earlier, the fluoride$^{1-}$ ions may be precipitated from the ammonium polyphosphate solution prior to producing the fire-retardant composition or the fluoride$^{1-}$ ions may be precipitated from a prepared ammonium polyphosphate fire-retardant composition. Additionally, the resulting fluoride crystals may be filtered from the ammonium polyphosphate fire-retardant composition or the fluoride crystals may be allowed to remain in suspension in the ammonium phosphate fire-retardant composition. The common practice of storing ammonium polyphosphate fire-retardant compositions for significant periods of time, for example over a winter between wildland fire seasons, may facilitate the filtering of the fluoride crystals because the fluoride crystals are allowed to settle in the storage tank.

In one embodiment of the invention the corrosion inhibiting agent is present in an effective amount to obtain a corrosivity to 2024-T3 aluminum, 4130 steel, yellow brass, and magnesium to a maximum of 5.0 mils per year penetration (mpy) as specified in Table 4 of Specification 5100-304b (January 2000) superceding Specification 5100-304a (February 1986) entitled "United States Department of Agriculture Forest Service Specification for Long Term Retardant, Wildland Fire, Aircraft or Ground Application".

In a preferred embodiment of the invention the ammonium polyphosphate fire-retardant composition comprises ammonium polyphosphate pre-treated with a corrosion inhibiting agent in the form 0.5% by weight aluminum$^{3+}$ added as aluminum sulphate. The fire-retardant composition additionally includes 0.5% by weight benzoate ion added as sodium benzoate, 0.25% by weight ethanolamine, 0.25% by weight benzotriazole, clay, and a colouring agent. Aluminum$^{3+}$ is the preferred constituent ion for the corrosion inhibiting agent because iron, calcium and magnesium are known to alter the pyrolysis reactions of phosphate as stated by C. W. George et al., at page 54 in General Technical Report INT-41 (1977); USDA Forest Service; Inter-mountain Forest and Range Experimental Station; Ogden, Utah, which is incorporated herein by reference. Furthermore, it is known that one aluminum$^{3+}$ ion is able to complex up to six fluoride$^{1-}$ ions.

Referring now to the figures, Table 2 shows the corrosion characteristics of fire-retardant compositions according to the invention based on electrochemical tests and 1 day immersion tests. Briefly, nominally 1 inch by 0.75 inch by 0.125 inch metal test coupons were measured to determine their precise dimension and engraved with a unique identifier. The coupons were then degreased, cleaned to remove oxidation films, rinsed with distilled water, dried, and weighed. Each test coupon was then immersed in a fire-retardant composition, according to the invention, contained in a glass jar and placed in an incubator at a test temperature of 49° C. After sitting for 1 day the test coupons were subject to linear polarization resistance electrochemical testing following standard procedures. The test coupons were then removed from the fire retardant compositions. The test coupons were cleaned to remove any residual fire-retardant composition and loose corrosion products, rinsed with distilled water, dried and weighed. The change in weight was then used to calculate the corrosion rate which is extrapolated from 1 day to be expressed in mils per year penetration (mpy).

In Table 2, the percentages provided are percentages by weight:

Control 1 is ammonium polyphosphate.

Control 2 is ammonium polyphosphate with clay and colouring agent.

Control 3 is ammonium polyphosphate with clay and coloring agent.

Control 4 is ammonium polyphosphate with sodium ferrocyamide.

Control 5 is diluted ammonium polyphosphate with sodium ferrocyamide.

Sample 1 is ammonium polyphosphate with 0.5% ferric$^{3+}$ ion as ferric nitrate; 0.25% triethylene tetramine; 0.25% benzotriazole; clay; and coloring agent.

Sample 2 is diluted ammonium polyphosphate pre-treated with 0.5% ferric$^{3+}$ ion as ferric nitrate; 0.5% benzoate ion as a sodium salt; 1.0% calcium$^{2+}$ ion as Ca(OH)$_2$; 0.25% ethanolamine; 0.25% benzotriazole; clay; and coloring agent.

Sample 3 is ammonium polyphosphate with 0.5% ferric$^{3+}$ ion as ferric nitrate; 0.25% triethanolamine; 0.25% benzotriazole; clay; and coloring agent.

Sample 4 is ammonium polyphosphate pre-treated with 0.5% aluminum$^{3+}$ as aluminum sulphate; 0.5% benzoate ion as a sodium salt; 0.5% silicate ion; 0.25% ethanolamine; 0.25% benzotriazole; clay; and coloring agent.

Sample 5 is ammonium polyphosphate with 0.5% benzoate ion as a sodium salt; 1.0% calcium$^{2+}$ ion as Ca(OH)$_2$; 0.25% ethanolamine; 0.25% Benzotriazole; clay; coloring agent; and 1.0% arabic gum.

Sample 6 is ammonium polyphosphate with 0.5% benzoate ion as a sodium salt; 0.25% calcium$^{2+}$ ion as Ca(OH)$_2$; 0.25% ethanolamine; 0.25% benzotriazole; clay; and coloring agent.

Sample 7 is ammonium polyphosphate with 0.5% ferric$^{3+}$ ion as ferric nitrate; 0.25% benzotriazole; clay; and coloring agent.

Sample 8 is ammonium polyphosphate with 0.5% benzoate ion as a sodium salt; 0.5% calcium$^{2+}$ ion as Ca(OH)$_2$; 0.25% ethanolamine; 0.25% benzotriazole; clay; and coloring agent.

Sample 9 is ammonium polyphosphate pre-treated with 0.5% aluminum$^{3+}$ as aluminum sulphate; 0.5% benzoate ion as a sodium salt; 1.0% magnesium$^{2+}$ ion as Mg(SO)$_4$.7H$_2$O; 0.25% ethanolamine; 0.25% benzotriazole; clay; and coloring agent.

Sample 10 is ammonium polyphosphate with 0.5% benzoate ion as a sodium salt; 1.0% calcium$^{2+}$ ion as Ca(OH)$_2$; 0.25% ethanolamine; 0.25% benzotriazole; clay; coloring agent; and 1.0% xanthan gum.

Sample 11 is ammonium polyphosphate pre-treated with 0.5% aluminum$^{3+}$ ion as aluminum hydroxide; 0.5% benzoate ion as a sodium salt; 1.0% calcium$^{2+}$ ion as Ca(OH)$_2$; 0.25% benzotriazole; 0.25% benzotriazole; clay; and coloring agent.

Sample 12 is ammonium polyphosphate pre-treated with 0.5% aluminum$^{3+}$ ion as aluminum sulphate; 0.5% benzoate ion as a sodium salt; 1.0% calcium$^{2+}$ ion as Ca(OH)$_2$; 0.25% VpCl®-644; 0.25% benzotriazole; clay; and coloring agent.

Sample 13 is ammonium polyphosphate with 0.5% benzoate ion as a sodium salt; 0.5% silicate ion as a sodium salt; 0.25% benzotriazole; clay; and colouring agent.

Sample 14 is ammonium polyphosphate with 0.5% benzoate ion as sodium salt; 1.0% calcium$^{2+}$ ion as Ca(OH)$_2$; 0.25% diethylamine; 0.25% benzotriazole; clay; and coloring agent.

Sample 15 is ammonium polyphosphate with 0.5% benzoate ion as a sodium salt; 1.0% calcium$^{2+}$ ion as Ca(OH)$_2$; 0.25% diethanolamine; 0.25% benzotriazole; clay; and coloring agent.

Sample 16 is ammonium polyphosphate pre-treated with 0.5% ferric$^{3+}$ ion as ferric nitrate; 0.5% benzoate ion as a sodium salt; 0.2% silicate ion as a sodium salt; 0.25% benzotriazole; clay; and coloring agent.

Sample 17 is ammonium polyphosphate with 0.5% benzoate ion as a sodium salt; 1.0% calcium$^{2+}$ ion as Ca(OH)$_2$; 0.25% benzotriazole; clay; and coloring agent.

Sample 18 is ammonium polyphosphate with 0.5% benzoate ion as a sodium salt; 1.0% calcium$^{2+}$ ion as Ca(OH)$_2$; 0.25% triethylenetetramine; 0.25% benzotriazole; clay; and coloring agent.

Sample 19 is ammonium polyphosphate with 0.5% benzoate ion as sodium salt; 1.0% calcium$^{2+}$ ion as Ca(OH)$_2$; 0.25% diethylamine; 0.25% benzotriazole; clay; and coloring agent.

Sample 20 is ammonium polyphosphate pre-treated with 0.5% aluminum$^{3+}$ ion as aluminum sulphate; 0.5% benzoate ion as a sodium salt; 0.2% silicate ion; ethanolamine; 0.25% benzotriazole; clay; and coloring agent.

Sample 21 is ammonium polyphosphate pre-treated with 1.0% calcium$^{2+}$ ion as Ca(OH)$_2$; 0.5% benzoate ion as a sodium salt; 1.0% calcium$^{2+}$ ion as Ca(OH)$_2$; 0.25% ethanolamine; 0.25% benzotriazole; clay; and coloring agent.

Sample 22 is ammonium polyphosphate pre-treated with 0.5% aluminum$^{2+}$ as aluminum sulphate; 0.5% benzoate ion; 1.0% calcium$^{2+}$ ion as Ca(OH)$_2$; 0.25% VpCl®-644, a proprietary vapour phase corrosion inhibitor from Cortec Corporation of St. Paul, Minn., United States of America; 0.25% ethanolamine; 0.25% benzotriazole; clay; and colouring agent.

Sample 23 is ammonium polyphosphate with 0.5% benzoate ion as a sodium salt; 1.0% calcium$^{2+}$ ion as Ca(OH)$_2$; 0.25% triethanolamine; 0.25% benzotriazole; clay; and coloring agent.

Sample 24 is ammonium polyphosphate pre-treated with 0.5% aluminum$^{2+}$ as aluminum sulphate; 0.5% benzoate ion as a sodium salt; 0.2% silicate ion as a sodium salt; 0.25% benzotriazole; clay; and colouring agent.

Sample 25 is diluted ammonium polyphosphate pre-treated with 0.5% aluminum$^{3+}$ ion as aluminum sulphate; 0.5% benzoate ion as a sodium salt; 1.0% calcium$^{2+}$ ion as Ca(OH)$_2$; 0.25% ethanolamine; 0.25% benzotriazole; clay; and coloring agent.

Sample 26 is ammonium polyphosphate with 0.5% benzoate ion as a sodium salt; 1.0% calcium$^{2+}$ ion as Ca(OH)$_2$; 0.25% ethanolamine; 0.25% benzotriazole; clay; and coloring agent.

Sample 27 is ammonium polyphosphate pre-treated with 0.5% ferric$^{3+}$ ion as ferric nitrate; 0.5% benzoate ion as a sodium salt; 1.0% calcium$^{2+}$ on as Ca(OH)$_2$; 0.25% ethanolamine; 0.25% benzotriazole; clay; and coloring agent.

Sample 28 is ammonium polyphosphate with 0.5% benzoate ion as a sodium salt; 0.5% silicate ion as a sodium salt; 0.25% benzotriazole; clay; and colouring agent.

Sample 29 is ammonium polyphosphate with 0.5% aluminum$^{3+}$ ion as aluminum sulphate; 0.5% benzoate ion as a sodium salt; 1.0% calcium$^{2+}$ ion as Ca(OH)$_2$; 0.25% ethanolamine; 0.25% benzotriazole; clay; and coloring agent.

Sample 30 is ammonium polyphosphate pre-treated with 0.5% calcium$^{2+}$ ion as Ca(OH)$_2$; 0.5% benzoate ion as a sodium salt; 1.0% calcium$^{2+}$ ion as Ca(OH)$_2$; 0.25% ethanolamine; 0.25% benzotriazole; clay; and coloring agent.

Sample 31 is ammonium polyphosphate pre-treated with 0.5% aluminum$^{3+}$ ion as aluminum sulphate; 1.0% magnesium$^{2+}$ ion as Mg(SO)$_4$.7H$_2$O; 0.25% ethanolamine; 0.25% benzotriazole; clay; and coloring agent.

Sample 32 is ammonium polyphosphate pre-treated with 0.5% aluminum$^{2+}$ as aluminum sulphate; 0.5% benzoate ion as a sodium salt; 1.0% calcium$^{2+}$ ion as Ca(OH)$_2$; 0.25% ethanolamine; 0.25% benzotriazole; clay; and colouring agent.

Sample 33 is ammonium polyphosphate pre-treated with 0.5% calcium$^{2+}$ ion as Ca(OH)$_2$; 0.5% benzoate ion as a sodium salt; 1.0% calcium$^{2+}$ ion as Ca(OH)$_2$; 0.25% ethanolamine; 0.25% benzotriazole; clay; and coloring agent.

Sample 34 is ammonium polyphosphate with 0.5% ferric$^{3+}$ ion as ferric nitrate; 0.5% benzoate ion as a sodium salt; 1.0% calcium$^{2+}$ ion as Ca(OH)$_2$; 0.25% ethanolamine; 0.25% benzotriazole; clay; and coloring agent.

Sample 35 is ammonium polyphosphate pre-treated with 1.0% ferric$^{3+}$ ion as ferric nitrate; 0.5% benzoate ion as a sodium salt; 1.0% calcium$^{2+}$ ion as Ca(OH)$_2$; 0.25% ethanolamine; 0.25% benzotriazole; clay; and coloring agent.

Sample 36 is ammonium polyphosphate pre-treated with 1.0% ferric$^{3+}$ ion as ferric nitrate; 0.5% benzoate ion as a sodium salt; 1.0% calcium$^{2+}$ ion as Ca(OH)$_2$; 0.25% ethanolamine; 0.25% benzotriazole; clay; and coloring agent.

Sample 37 is ammonium polyphosphate pre-treated with 1.0% aluminum$^{3+}$ ion as aluminum sulphate; 0.5% benzoate ion as a sodium salt; 1.0% calcium$^{2+}$ ion as Ca(OH)$_2$; 0.25% ethanolamine; 0.25% benzotriazole; clay; and coloring agent.

Sample 38 is ammonium polyphosphate pre-treated with 0.5% aluminum$^{2+}$ as aluminum sulphate; 0.5% benzoate ion as a sodium salt; 1.0% calcium$^{2+}$ ion as Ca(OH)$_2$; 0.25% ethanolamine; 0.25% benzotriazole; clay; and colouring agent.

The data from Table 2 indicates that complexing or precipitating fluoride$^{1-}$ ions according to the present invention may lower the corrosivity of ammonium polyphosphate to one three-hundredth of the rate of commercially available ammonium polyphosphate, as measured by electrochemical tests. It is anticipated that the corrosion rates of the 1 day tests will be confirmed by immersion testing as being below the stated limits specified in Table 4 of Specification 5100-304b (January 2000) superceding Specification 5100-304a (February 1986) entitled "United States Department of Agriculture Forest Service Specification for Long Term Retardant, Wildland Fire, Aircraft or Ground Application".

Table 3 shows the corrosion characteristics of various ammonium polyphosphate fire-retardant compositions, according to the invention, based on 30 day immersion tests. Briefly, nominally 1 inch by 1 inch by 0.125 inch metal test coupons were measured to determine their precise dimension and engraved with a unique identifier. The coupons were then degreased, cleaned to remove oxidation films, rinsed with distilled water, dried, and weighed. Each test coupon was then immersed in a fire-retardant composition, according to the invention, contained in a glass jar and placed in an incubator at a test temperature of 49° C. The test coupons were then removed from the fire retardant compositions. The test coupons were cleaned to remove any residual fire-retardant composition and loose corrosion products, rinsed with distilled water, dried and weighed. The change in weight was then used to calculate the corrosion rate which is extrapolated from 30 day to be expressed in mils per year penetration (mpy).

In Table 3, the percentages are percent by weight:

Control 1 is ammonium polyphosphate.

Control 2 is ammonium polyphosphate with clay and colouring agent.

Sample 1 is ammonium polyphosphate with 0.5% benzoate ion as a sodium salt; 1.0% calcium$^{2+}$ ion as Ca(OH)$_2$; 0.25% ethanolamine; 0.25% benzotriazole; clay; and coloring agent.

Sample 2 is ammonium polyphosphate pre-treated with 0.5% calcium$^{2+}$ ion as Ca(OH)$_2$; 0.5% benzoate ion as a sodium salt; 1.0% calcium$^{2+}$ ion as Ca(OH)$_2$; 0.25% ethanolamine; 0.25% benzotriazole; clay; and coloring agent.

Sample 3 is ammonium polyphosphate with 0.5% silicate$^{4+}$ ion as a sodium salt; 0.25% benzotriazole; clay; and colouring agent.

Sample 4 is ammonium polyphosphate with 0.5% ferric$^{3+}$ ion as ferric nitrate; 0.25% benzotriazole; clay; and coloring agent.

Sample 5 is ammonium polyphosphate with 1.0% ferric$^{3+}$ ion as ferric sulphate; 0.25% benzotriazole; clay; and coloring agent.

Sample 6 is ammonium polyphosphate pre-treated with 0.5% ferric$^{3+}$ ion as ferric nitrate; 0.5% benzoate ion as a sodium salt; 0.2% silicate ion as a sodium salt; 0.25% benzotriazole; clay; and coloring agent.

Sample 7 is ammonium polyphosphate pre-treated with 1.0% ferric$^{3+}$ ion as ferric nitrate; 0.5% benzoate ion as a sodium salt; 1.0% calcium$^{2+}$ ion as Ca(OH)$_2$; 0.25% ethanolamine; 0.25% benzotriazole; clay; and coloring agent.

Sample 8 is ammonium polyphosphate pre-treated with 0.5% aluminum$^{2+}$ as aluminum sulphate; 0.5% benzoate ion as a sodium salt; 0.2% silicate ion as a sodium salt; 0.25% benzotriazole; clay; and colouring agent.

Sample 9 is ammonium polyphosphate pre-treated with 0.5% aluminum$^{2+}$ as aluminum sulphate; 0.5% benzoate ion as a sodium salt; 1.0% calcium$^{2+}$ ion as Ca(OH)$_2$; 0.25% ethanolamine; 0.25% benzotriazole; clay; and colouring agent.

In view of the above, it will be understood by a person skilled in the art that the invention provides a new and non-obvious means for reducing the corrosivity of ammonium polyphosphate which has industrial applicability in the production of ammonium polyphosphate fire-retardant compositions.

It will be further understood by a person skilled in the art that many of the details provided above are by way of example only and are not intended to limit the scope of the invention which is to be determined with reference to the following claims. More specifically, it will be understood that the method for reducing the corrosivity of ammonium polyphosphate solutions disclosed herein may be used to reduce the corrosivity of ammonium polyphosphate solutions used in applications other than the production of ammonium polyphosphate fire-retardant compositions. For example, the corrosion-inhibited ammonium polyphosphate solutions of the invention may be used in the production of fertilizers.

What is claimed is:

1. A fire-retardant composition comprising:
    an ammonium polyphosphate;
    a suspending agent; and
    an effective amount of a corrosion inhibiting agent including at least one ion selected from the group of ions consisting of aluminum ions, ferric ions, calcium ions and magnesium ions, when the corrosion inhibiting agent is in solution, and wherein said ions complex an effective amount of fluoride ions present in the fire-retardant composition to reduce the corrosiveness of the fire-retardant composition.

2. The fire-retardant composition as claimed in claim 1, wherein the corrosion inhibiting agent includes aluminum ions added as aluminum sulphate.

3. The fire-retardant composition as claimed in claim 1, wherein the fire-retardant composition comprises between 0.1% to 1.0% by weight aluminum ions.

4. The fire-retardant composition as claimed in claim 1, wherein the fire-retardant composition comprises 0.5% by weight aluminum ions.

5. The fire-retardant composition as claimed in claim 1, further including a thickening agent.

6. The fire-retardant composition as claimed in claim 1, further including a coloring agent.

7. The fire-retardant composition as claimed in claim 1, further including an amine.

8. The fire-retardant composition as claimed in claim 1, further including an azole.

9. A fire-retardant composition comprising:
    an ammonium polyphosphate;
    a suspending agent; and
    a corrosion inhibiting agent including an effective amount of aluminum ions when in solution, the aluminum ions being added as aluminum sulphate, and wherein the aluminum ions complex an effective amount of fluoride ions present in the fire-retardant composition to reduce the corrosiveness of the fire-retardant composition.

10. The fire-retardant composition as claimed in claim 9, wherein the fire-retardant composition comprises between 0.1% to 1.0% by weight aluminum ions.

11. The fire-retardant composition as claimed in claim 9, wherein the fire-retardant composition comprises 0.5% by weight aluminum ions.

12. The fire-retardant composition as claimed in claim 9, wherein the corrosion inhibiting agent further includes at least one ion selected from the group consisting of magnesium ions and calcium ions, when in solution.

13. The fire-retardant composition as claimed in claim 9, further including a thickening agent.

14. The fire-retardant composition as claimed in claim 9, further including a coloring agent.

15. The fire-retardant composition as claimed in claim 9, further including an amine.

16. The fire-retardant composition as claimed in claim 9, further including an azole.

* * * * *